No. 634,106. Patented Oct. 3, 1899.
H. P. GAMBLE & A. BLACK.
HEEL NAILING MACHINE.
(Application filed Mar. 27, 1899.)

(No Model.) 6 Sheets—Sheet 1.

Witnesses: Inventors
Henry P. Gamble
Arthur Black
By Wm. E. Boulter assignee

No. 634,106. Patented Oct. 3, 1899.
H. P. GAMBLE & A. BLACK.
HEEL NAILING MACHINE.
(Application filed Mar. 27, 1899.)

(No Model.) 6 Sheets—Sheet 2.

Witnesses: Inventors
Henry P. Gamble
Arthur Black,
By Wm. E. Poulter,
Attorney

No. 634,106. Patented Oct. 3, 1899.
H. P. GAMBLE & A. BLACK.
HEEL NAILING MACHINE.
(Application filed Mar. 27, 1899.)
(No Model.) 6 Sheets—Sheet 3.
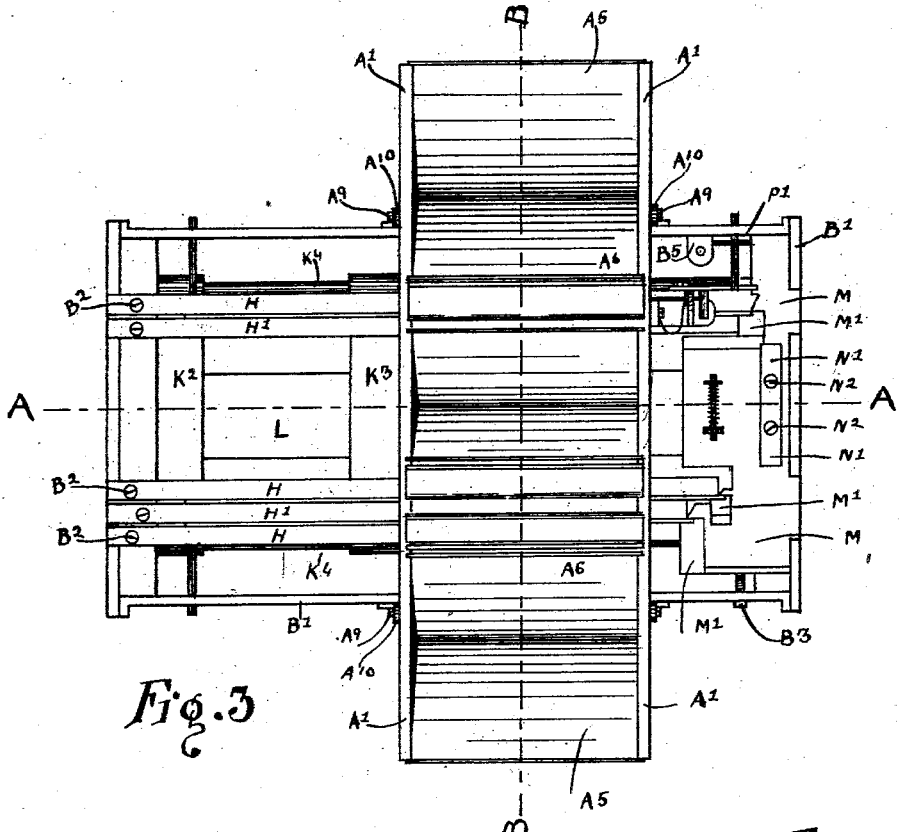
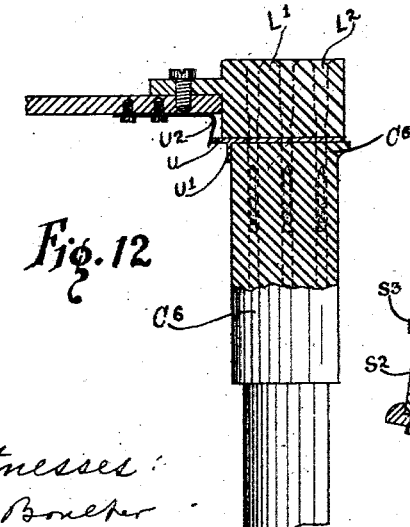
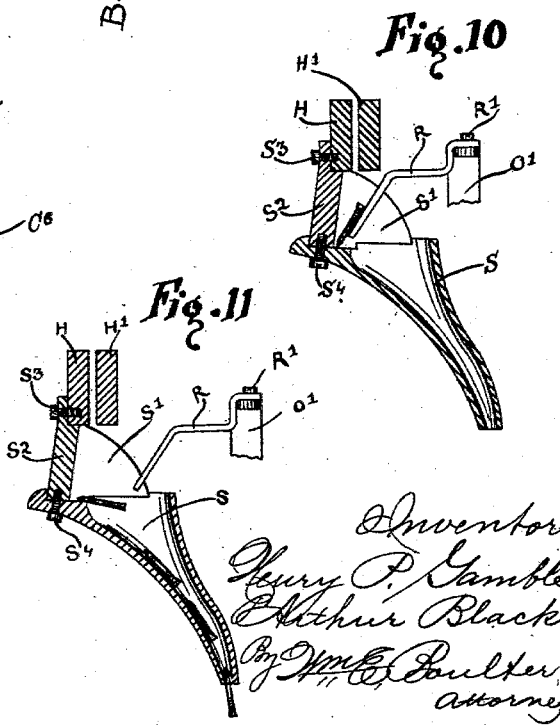

No. 634,106. Patented Oct. 3, 1899.
H. P. GAMBLE & A. BLACK.
HEEL NAILING MACHINE.
(Application filed Mar. 27, 1899.)

(No Model.) 6 Sheets—Sheet 4.

Witnesses
Inventors:
Harry P. Gamble
Arthur Black
By Wm E. Boulter,
Attorney

No. 634,106. Patented Oct. 3, 1899.
H. P. GAMBLE & A. BLACK.
HEEL NAILING MACHINE.
(Application filed Mar. 27, 1899.)
(No Model.) 6 Sheets—Sheet 5.

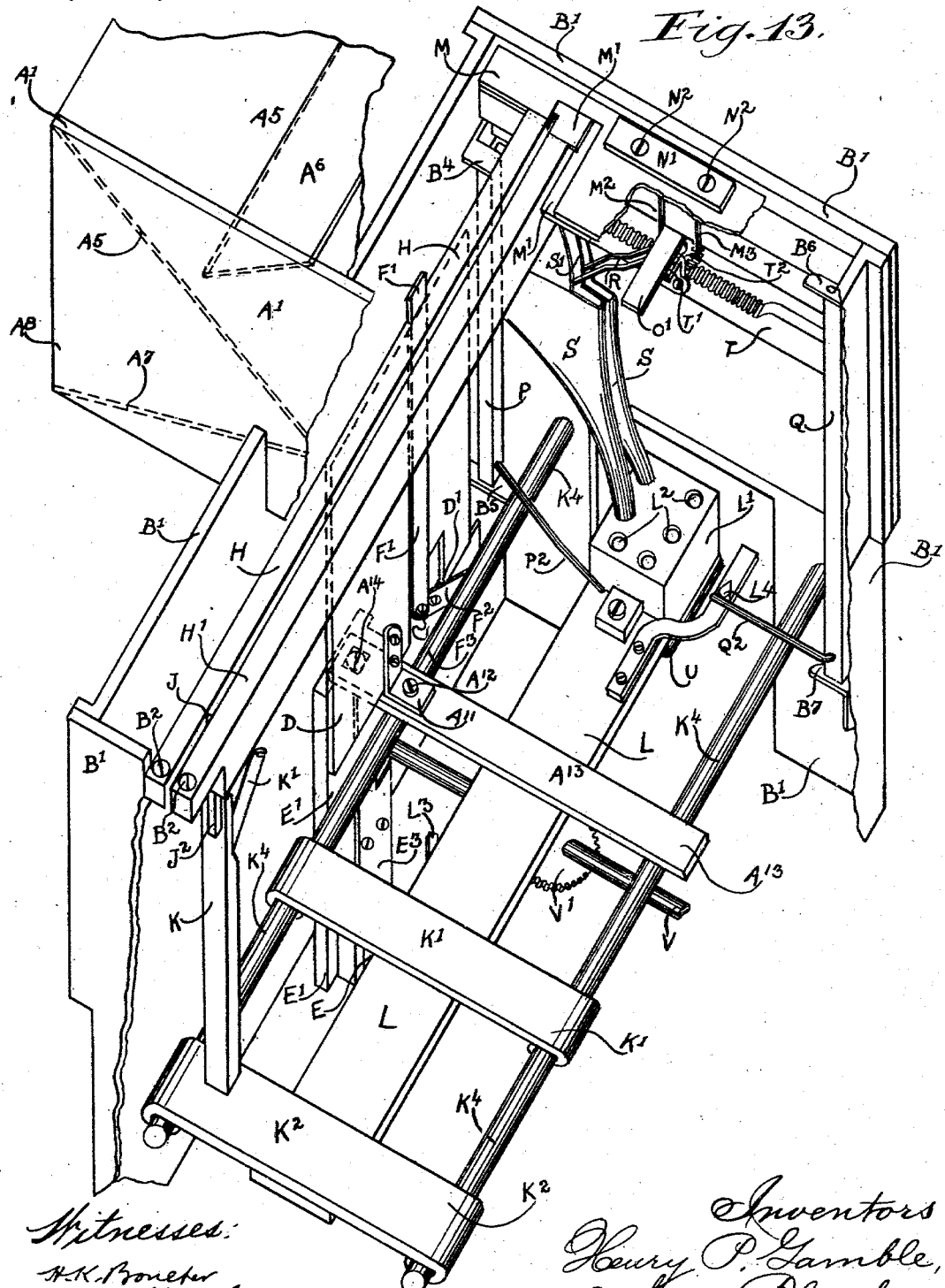

UNITED STATES PATENT OFFICE.

HENRY PERCIVAL GAMBLE AND ARTHUR BLACK, OF LEICESTER, ENGLAND.

HEEL-NAILING MACHINE.

SPECIFICATION forming part of Letters Patent No. 634,106, dated October 3, 1899.

Application filed March 27, 1899. Serial No. 710,655. (No model.)

*To all whom it may concern:*

Be it known that we, HENRY PERCIVAL GAMBLE and ARTHUR BLACK, subjects of the Queen of Great Britain, residing at Leicester, England, have invented certain new and useful Improvements in or Relating to Heeling Machinery, (for which Letters Patent have been applied for in Great Britain, No. 19,079, dated September 7, 1898,) of which the following is a specification.

This invention relates to heeling-machinery employed in the manufacture of boots and shoes, and has for its object to provide heel building or attaching machines with mechanism for automatically feeding the horn of such machines with the nails by which the heels are attached to a boot or shoe.

The invention will be understood from the following further description in reference to the accompanying drawings, in which—

Figure 1:
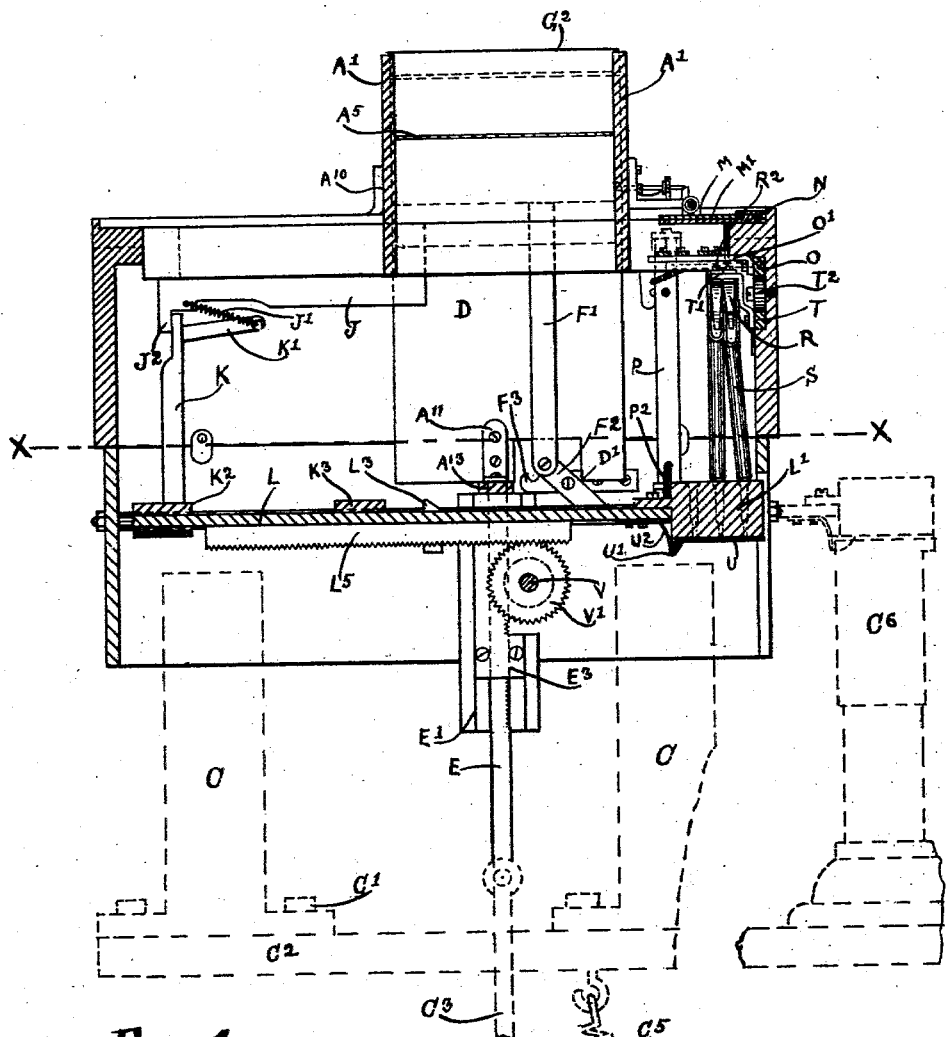
Figure 2:
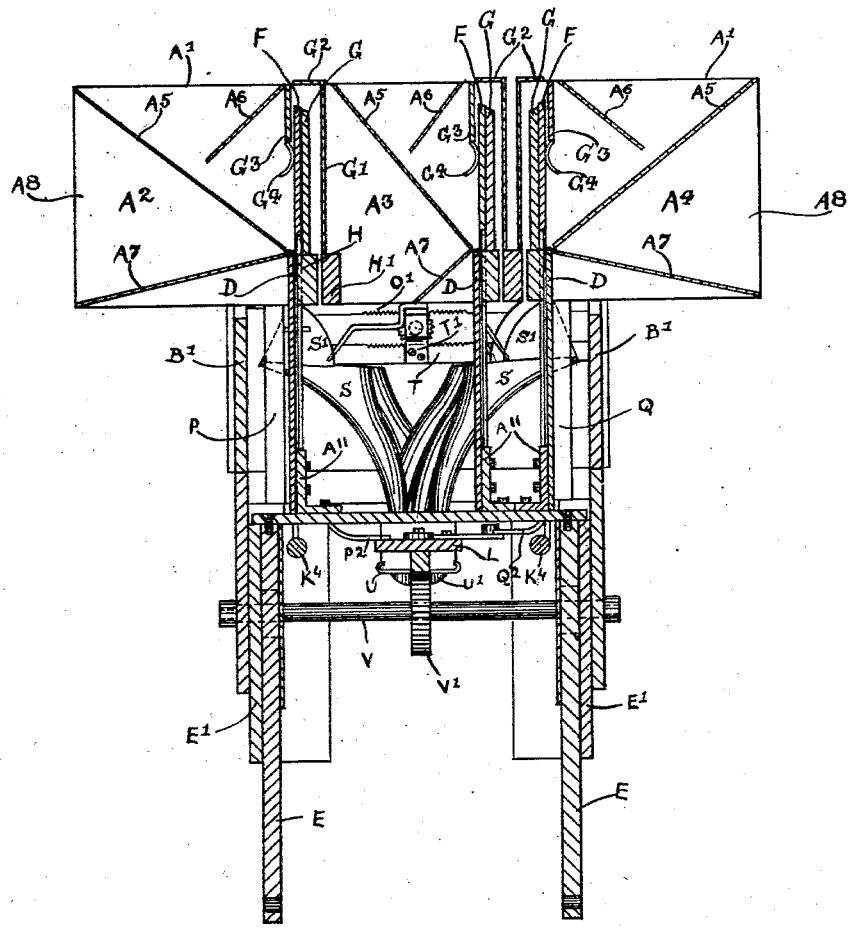
Figure 4:
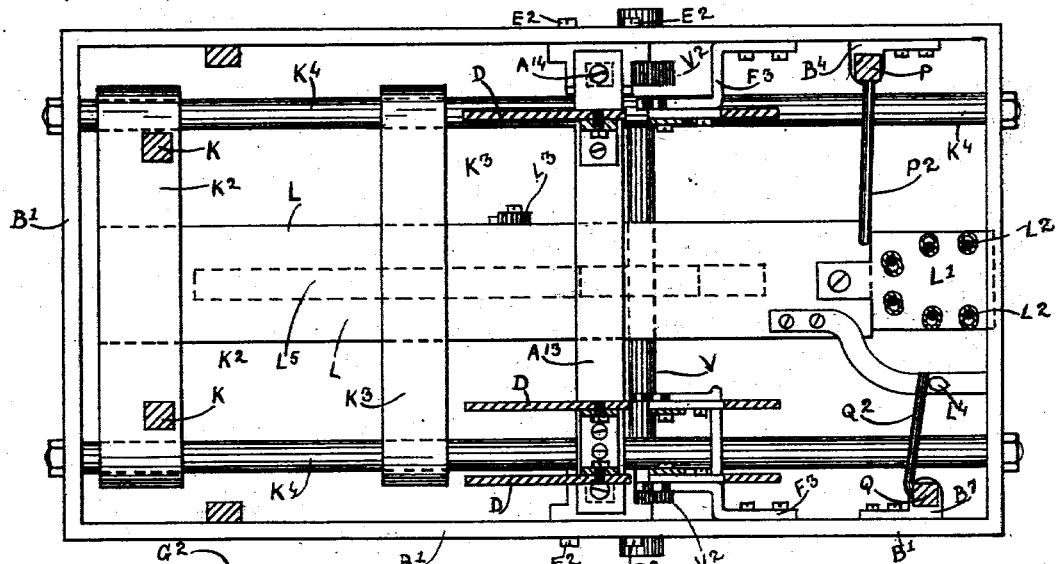
Figure 6:
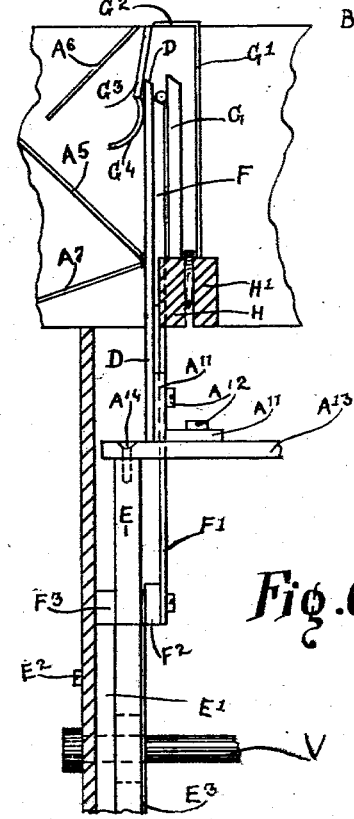
Figure 5:
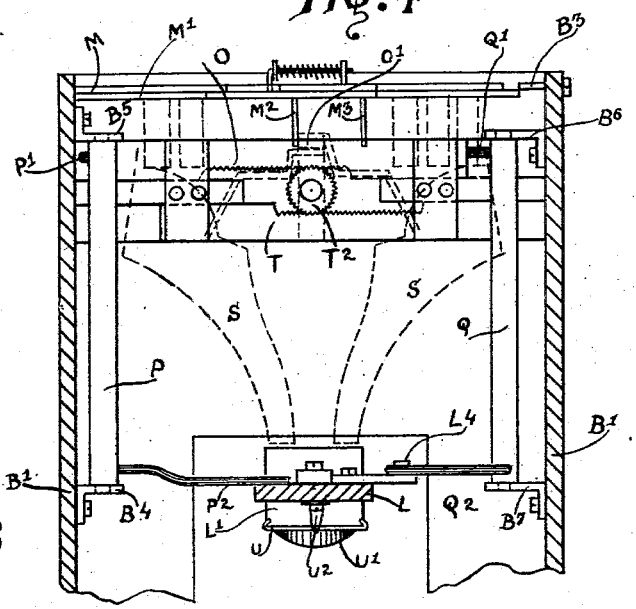
Figure 7:
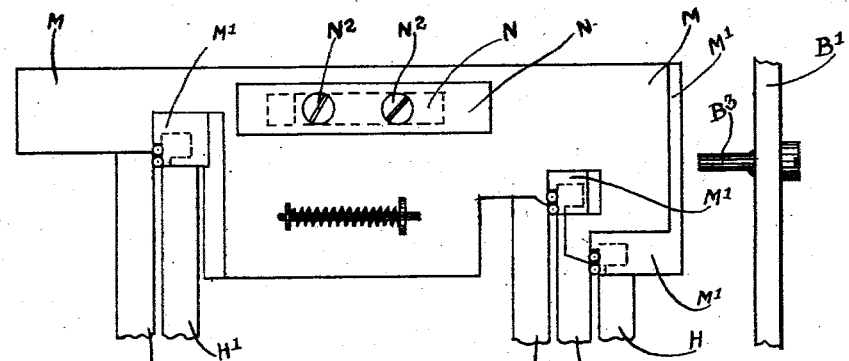
Figure 8:
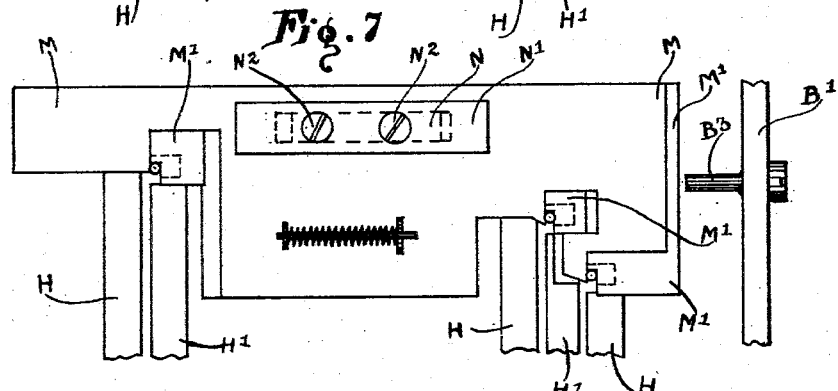
Figure 9:
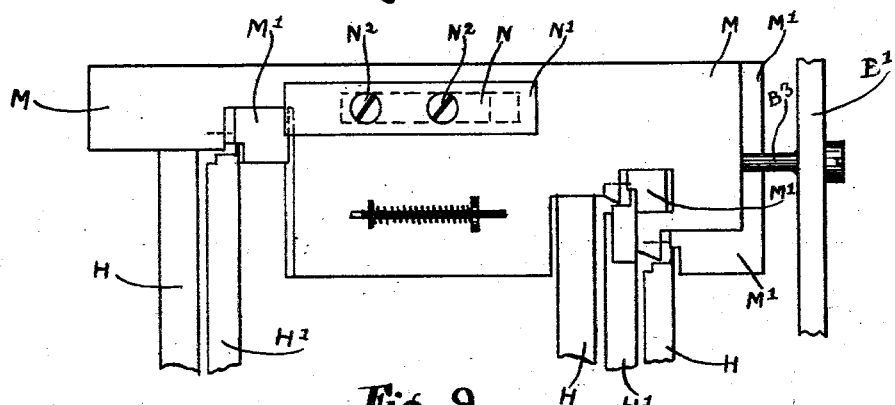

Figure 1 is a longitudinal section on the line A A of Fig. 3. Fig. 2 is a transverse section on the line B B of the same figure, and Fig. 3 is a plan of the automatic feeding apparatus for heeling-machines constructed in accordance with this invention. Fig. 4 is a longitudinal section on the line X X of Fig. 1. Fig. 5 is an elevation of the rack-and-pinion mechanism for actuating the transverse slides and shutters of the nail-chutes. Fig. 6 is a detail view showing the nail elevating and delivery slides after the former has raised its nails out of the hopper and transferred them to the latter. Figs. 7, 8, and 9 are plans of parts of the transverse slides in different positions. Figs. 10 and 11 are details of the nail-chutes and shutters therefor. Fig. 12 is a detail view of the nail-receiver and a horn of a heeling-machine in the act of receiving nails from the former. Fig. 13 is a perspective view, partly broken away, of our invention.

The parts of a heeling-machine necessary to a clear understanding of the invention are shown in dotted lines.

$A'$ represents a rectangular box or casing which is fixed transversely over another box or casing $B'$, which latter is carried by upright arms $C$, bolted at $C'$ to the bed-plate $C^2$ of a heeling-machine.

The box $A'$ contains the main supply of nails and may be divided into compartments or hoppers, three, $A^2$ $A^3$ $A^4$, being shown, as most clearly indicated in Fig. 2. Each hopper has an inclined platform $A^5$, so that the heel-nails when placed therein descend of their own weight to the bottom and in the path of a vertical nail-elevating slide D. An inclined plate $A^6$ near the open upper end of the hopper causes any nails which fall thereon when the latter is being filled to slide onto the platform $A^5$. Another inclined plate $A^7$ is located under the platform $A^5$, so that when it is desired to change the size or gage of the nails already in the hopper the latter may be quickly emptied by withdrawing the said plate $A^5$, whereupon the nails will fall *en masse* onto the plate $A^7$ and roll down it and through the open end $A^8$ of the box into a receptacle which the operator may place or hold to receive them. Each of the three plates $A^5$ $A^6$ $A^7$ stretches across the full width of the hopper and fits movably in grooves formed on the inner surface of the sides of the said box.

The box $A'$ is attached to the box $B'$ by screws $A^9$ and angle-plates $A^{10}$.

The floor of each hopper is formed by the upper edge of the nail-elevating slide or selector D, which, as shown, consists of a thin metal plate, each side of which is located in a groove in the side of the box. The lower end of this selector is attached by means of an angle-plate $A^{11}$ and screws $A^{12}$ to a cross-bar $A^{13}$, and the latter is attached at each end by a screw $A^{14}$ to the upper end of a vertical rack E, located in grooved guide-plates $E'$, fastened by screws $E^2$, Figs. 4 and 6, to the inner face of the box $B'$. A plate $E^3$, screwed over the open side of the guides, keeps the rack from displacement by any vibration or shock during the working of the machine.

The two vertical racks E may be connected by a cross-head and the latter attached centrally to the connecting-rod $C^3$ from a foot-treadle $C^4$, or the said connecting-rod may be attached to the end of one of the said racks, as shown in Fig. 1. A spring $C^5$ is connected one end to the foot-treadle and the other end to the bed-plate $C^2$, and while the operator keeps his foot pressing on the treadle the racks and the nail-elevator are maintained in their lowest positions; but immediately the operator removes his foot from the treadle the spring raises the latter, the connecting-rod $C^3$, racks E, cross-bar $A^{13}$, and the nail-elevating slide D, and the latter in moving upward in the hopper in which the heel-nails are contained lifts some of the latter with it on its upper edge.

The nail-elevator slide is located parallel to and close against a delivery-slide F, and as it rises, carrying on its upper edge the selected nails, the latter are prevented falling off by bearing against the side of this slide. When the upper edge of the elevator-slide becomes coincident or in register with the upper edge of the slide F, the nails, which are lying lengthwise, roll off the inclined edge of the elevator onto the inclined upper edge of the adjacent slide. This latter slide moves in grooves in the sides of the box, and when in its normal position—that is, when the elevator is at its lowest point (indicated in Fig. 2)—its upper edge is situate just above the upper edge of a parallel partition G, over which, as hereinafter described, it delivers the nails. When, however, the elevator-slide commences to ascend, the slide F falls down below the upper edge of the partition into the position indicated in Fig. 6 preparatory to receiving on its upper edge the nails as they roll off the elevator-slide. It will be observed that when the said slide is in this lowered position a space or narrow chamber is formed between the partition G and the elevator-slide D, and as the nails drop onto the edge of the said slide F they are prevented falling off by the partition on the one side and the elevator-slide on the other side.

The delivery-slide F is supported on the top of a vertical lever F', the upper end of which passes through a guide-slot in the bar H, to be described, while the lower end is pivoted to a short lever $F^2$, fulcrumed to a short arm $F^3$, projecting from the inner side of the box B'.

When the nail-elevator is in its lowest position at the bottom of the hopper, as shown in Figs. 1 and 2, the corner of the foot D' of the former rests on the lever $F^2$ to the right of its center, and acting as a counterweight presses down that end of the lever and raises its other end, which thereby elevates the vertical lever F', and the latter raises the pin-delivery slide F, which rests thereon, into the position shown in Fig. 2, where it parts with the nails on its upper edge, the said pins rolling over the partition G, as hereinbefore described. As the nail-elevating slide commences to ascend, and thereby removes its foot off the lever $F^2$, the delivery-slide drops of its own weight into its lower position, Fig. 6, hereinbefore described, in readiness to receive the nails from the ascending elevator-slide, and in doing so depresses the vertical lever F' and raises the end of the other lever $F^2$ into a position where the latter will again be actuated by the foot of the elevator-slide when the latter descends. When the delivery-slide has parted with its nails over the side of the partition, the nails fall into a passage formed between it and a similar partition or plate G', also fitted in a groove in each side of the box A'. The plate G' has an upper horizontal extension $G^2$, forming a cover to the passage between them, so as to prevent any nails shooting over the top when being delivered by the slide F, and a shutter or flap $G^3$ closes the opening above the delivery-slide and passage and prevents any nails which when being delivered strike the plate $G^2$ rebounding into the hopper.

The shutter $G^3$ is loosely hung on pins or trunnions resting loosely in the upper edge of the sides of the box A', and on its lower end it is provided with a curved wire $G^4$ or equivalent, which when the nail-elevator slide ascends will be moved on one side, thereby, as in Fig. 6, to let the latter pass, and will swing back of its own accord into the position shown in Fig. 2 when the elevator-slide descends.

The width of the passage between G and G' is approximately that of the thickness of the nails, and when the latter drop down the same they fall point downward into a space between two parallel bars H H' and become suspended by their heads and point downward, as indicated in Fig. 6. These bars are let into the ends of the box B' and are secured thereto by screws $B^2$, Fig. 3. Between each pair of bars is a slide J, the function of which is to move forward the nails hanging between the said bars until they drop through the end thereof, as hereinafter described. This slide is connected by means of a spring J' to an extension K' of a vertical arm K, which rises upwardly from a plate $K^2$, attached transversely to a slide or carriage L. This carriage has attached to it two transverse plates $K^2 K^3$, each of which has tubular ends fitting easily over two fixed shafts or guide-rods $K^4$, the ends of which are fitted in the ends of the box B'.

The nail-traversing slide J is provided with a tailpiece $J^2$, bearing against the vertical arm K, and when the carriage L makes its return movement the said vertical arm returns the slide to its original position.

The carriage on its forward end has fixed thereto a receiver L', consisting of a block having therein a number of holes $L^2$ for the reception of heel-nails, the said holes corresponding in number and position to those in the usual horn of a heeling-machine, and when the said receiver has returned to its original position the nails which were pushed to the ends of the bars drop thereinto as follows: The spaces between the bars H H' are continued into and have their termini between two slides M M', which have a transverse movement, whereby the nails drop into chutes underneath them. The said slides consist of two plates placed one above the other and slotted to pass over a block N (shown only in dotted lines in Figs. 7, 8, and 9) shorter than the slot and covered by a plate N', which also overlaps the uppermost slide M and is fixed in position by screws N², passing into the end of the box B'. The fact of the block N being shorter than the slot and slightly thicker than the combined depths of the two transverse slides permits the movement of the latter, as will be described. The terminus of the passage between the bars H H' is formed between the two slides M M', and when two heel-nails are moved by the slide J into the said terminal passage, as shown in Fig. 7, one nail is supported between the two slides M M' and the other nail is supported between the lower slide M' on the one side and the end of the bar H or H' on the other side. When the two slides move together to the right, the passage between the lower slide and the adjacent bar is widened, and the nail suspended between immediately drops into the chamber underneath, but the other nail is carried between the two slides, as shown in Fig. 8, until the uppermost plate M comes into contact with a stop-pin B³, passing through the side of the box B', when the lower of the two slides moves alone a short distance, thereby increasing the width of the terminal passage, as in Fig. 9, so that the nail held between the slides drops into the other chamber below. This movement of the slides is obtained as follows: On the under side of the lower slide are two downwardly-depending pins M² M³, which embrace an arm O', projecting outwardly from a horizontal slide-rack O, moving in a recess or guideway formed in the front end of the box B'. This slide-rack obtains its motion in one direction from an arm P', bearing thereagainst and connected to a vertical spindle P, mounted rotatably in lugs B⁴ B⁵, connected to the side of the box B'. The lower end of the said spindle is also furnished with an arm P², located in the track of a projection L³, secured to the side of the carriage L. When the latter moves into the box, the projection L³ moves the arm P² out of its way, thereby causing the upper arm P' to press against the end of the slide-rack O and move it toward the opposite side. The said slide-rack O obtains its motion in the return direction from an arm Q', pressing against its other end and attached to a vertical spindle Q, also mounted rotatably in lugs B⁶ B⁷, attached to the other side of the box B', and also furnished on its lower end with an arm Q², which on the carriage moving into the box comes into contact with a projection L⁴ thereon, which moves the said arm Q² out of its track, rotates the spindle Q, and causes the upper arm Q' to press with sufficient force against the end of the slide-rack O to move it toward the other side of the box. The return movement of the upper slide-rack O takes the arm P' back to its former position, rotating the spindle P and again shifting the lower arm P² into the track of the projection L³. The arm O' has also attached to it by screws R' a shutter R for each of the nail-chutes S, leading to the receiver L' from that side of the box B'. The chutes S on the opposite side are also furnished with shutters R, connected by screws R² to an arm T', projecting from another slide-rack T, which obtains its motion from a pinion T² in gear therewith and also gearing with the upper slide-rack O, from which it is actuated.

Reverting now to the transverse slides M M', it will be observed that these receive their motion in the one direction to allow the nails to drop into the chutes thereunder, as hereinbefore described, from the arm O' pressing against the downwardly-depending pin M³ and in the return direction to the position ready to receive a further supply of nails from the same arm pressing against the other pin M² when traveling in that direction. When the transverse slides are moved away from the bars H H', the nails drop through the passage between them into a chamber formed in the upper part of each nail-chute S and rest incliningly against the side of the shutter therein, as shown in Fig. 10, and when the shutter is withdrawn the nails fall head downward, as shown in Fig. 11, into one of the chutes S, the lower end of which is open and located immediately over an opening in the receiver L', so that the nails can pass into the latter, which becomes charged or loaded therewith.

The chambers are open-fronted and formed between a series of plates S', which are formed integrally with a back plate S², secured by screws S³ to the bars H, and the chutes S are fixed by screws S⁴ to the under side of the back plate S².

The floor of the receiver consists of a shutter U, provided with a number of through-perforations corresponding in number and position to the holes L² in the receiver. The shutter is furnished with a downwardly-depending lip U' and with a spring U², which maintains the shutter in such a position on the receiver that the holes in the two are not in register.

When the receiver is moved outwardly over the usual horn of a heeling-machine, as in Fig. 12, the lip on the receiver comes into contact with the edge of horn C⁶ and arrests the motion of the shutter just before the termination of the movement of the receiver, and immediately the holes in the receiver and its shutter become coincident the heel-nails drop through into the existing holes in the horn of the heeling-machine, which becomes thus automatically fed thereby.

The receiver and carriage L receive their motion from a rack L⁵ on the under side of the latter gearing with a spur-wheel V', located centrally on a shaft V, carried in bearings in the sides of the box B' and rotated by a pinion V² on each end thereof gearing with the racks E, which are connected to and actuated by the foot-treadle C⁴, as hereinbefore described.

The action of the machine is as follows:

Upon the operator lifting his foot off the treadle the spring $C^5$ raises the latter and the connecting-rod $C^3$, which elevates the racks E, the cross-bar $A^{13}$, attached thereto, and also the nail-elevator slide D. The latter carries on its upper edge some of the nails in the hopper and immediately upon commencing to rise removes its foot off the lever $F^2$, which thereby allows the adjacent slide F to drop, so that its upper edge is below the partition G, as in Fig. 6. When the nail-elevator slide in ascending passes above the delivery-slide F, the nails roll off the former onto the latter. Upon the operator again depressing the treadle the racks and elevator-slide are lowered, and the latter in descending drops its foot upon the lever $F^2$, which thereupon raises the vertical lever $F'$ and slide F, and the latter discharges its nails over the top of the partition G, when they drop between the bars H H' and become suspended by their heads, as hereinbefore described. Simultaneously with the raising of the said racks the latter rotate the pinions $V^2$ and the shaft V, and the central spur-wheel V' thereon engages the rack $L^5$ on the under side of the carriage L, thereby traversing the latter outwardly of the box, taking with it the upright arm K, connected to the slide J. The latter is thereby caused to move along between the bars H H' and push the nails suspended therebetween to the end of the passage and into the termini thereof formed in the transverse slides M M'. As the carriage L and the receiver return, the projection on the former collides with and moves the arm $P^2$ out of its path, thereby rotating the vertical spindle P and causing the arm $P'$ on the upper end thereof to press against the upper rack-slide O and move it along. The arm $O'$ on the latter thereupon moves the depending pin $M^3$ and the latter moves the two transverse slides M M' in the same direction. The bottom slide M' upon passing away from the bars H H' allows the heel-nail which was suspended between it and the latter to drop into the chamber at the top of one of the chutes immediately beneath and to rest against the shutter R, as in Fig. 10, while another nail is carried between the two slides until the top slide comes into contact with the stop-pin $B^3$, which arrests its progress while the lower slide moves a short distance *per se*, thus enlarging the space between them, so that the nail they carried now drops into the chamber of another chute immediately underneath. At the same time that the arm $O'$ moves the slides M M' as described it moves the shutters R into the chambers of the nail-chutes S on one side, and the pinion $T^2$, rotated by the upper rack $O'$, traverses the bottom rack T, and the latter moves the shutters R into the chambers of the nail-chutes on the other side, so that the nails which have dropped as the result of the movement of the transverse slide now remain supported on the said shutters, as described, and shown in Fig. 10. Just prior to the carriage L completing its inward movement the projection $L^4$ collides with the arm $Q^2$ and in passing moves it so that it rotates the vertical spindle Q and arm $Q'$ on the upper end thereof, and the said arm moves the slide-rack O and the latter, through the medium of the pinion $T^2$, moves the lower slide-rack T, so that the two racks withdraw the shutters and let the heel-nails fall head foremost down the nail-chutes S just as the receiver $L'$ arrives in position thereunder to receive them. Upon the loaded receiver coming forward the next time the lip $U'$ of the shutter strikes the horn $C^6$ of the heeling-machine and is arrested in its motion while the receiver moves *per se* slightly in advance until the holes in the shutter and the receiver are in register, when the nails drop through the latter and into the holes in the horn, as shown in Fig. 12.

Having now particularly described and ascertained the nature of our said invention and in what manner the same is to be performed, we declare that what we claim is—

1. In a machine of the character described the combination of a hopper, a nail-elevating slide therein, an adjacent slide for intercepting the nails off the latter, and discharging them, two or more bars arranged with spaces between for the reception of the said nails, a slide for moving the nails forward between the bars, transverse slides for intercepting the nails and dropping them into nail-chutes, a receiver located under the latter for the reception of the nails and adapted to be moved forward and discharge the said nails into the horn of a heeling-machine substantially as described.

2. In a machine of the character described, the combination of a hopper, a nail-elevator therein, slides arranged to discharge the nails, a series of parallel bars, arranged with intermediate spaces for receiving nails, slides arranged between the parallel bars, transverse slides arranged to intercept the nails, a series of nail-chutes into which the nails are dropped by the transverse slides, shutters for the said chutes and a receiver arranged under the nail-chutes, substantially as described.

3. In a machine of the character described the combination of a hopper, nail elevating and delivering slides, mechanism for actuating same, parallel bars with nail-spaces between, slide between said bars, mechanism to move the slide between said bars, nail-chutes under the latter, shutters for the chutes and rack-and-pinion mechanism for actuating the shutters in the manner and for the purpose described.

4. In a machine of the character described the combination of a hopper, nail elevating and delivery slides, parallel bars, slides between the latter, rack-and-pinion mechanism for actuating the last-named slide, nail-chutes, shutters for same, rack-and-pinion mechanism for the shutters, levers for operating the said racks, and carriage for actuating the said levers for the purpose described.

5. In a machine of the character described the combination of a hopper, nail elevating and delivery slides, parallel bars with spaces between, slides located in said spaces, a reciprocatory carriage to actuate said slide, rack-and-pinion mechanism operated by a foot-treadle to actuate the said carriage substantially as described.

6. In a machine of the character described, the combination of a hopper, nail elevating and delivery slides, parallel bars thereunder to receive nails, nail-chutes under said bars, slides arranged to eject the nails received between the parallel bars, shutters actuated to support the nails inclinvingly thereon and when withdrawn to let nails fall headforemost down chutes, and a receiver under said chutes operating as described.

7. In a machine of the character described the combination of a series of nail-hoppers, a series of nail elevating and discharge slides, a series of parallel bars, a series of slides between said bars, a series of nail-chutes under said parallel bars, a series of shutters to control entrance to said nail-chutes, a receiver under said chutes and mechanism for operating the receiver in the manner and for the purpose described.

In testimony whereof we have hereunto set our hands in the presence of the two subscribing witnesses.

HENRY PERCIVAL GAMBLE.
ARTHUR BLACK.

Witnesses:
E. N. LEWIS,
GEO. H. BLAKESLEY.